(12) United States Patent
Marchan

(10) Patent No.: US 7,106,207 B1
(45) Date of Patent: Sep. 12, 2006

(54) VEHICLE CHILD SEAT ALARM

(76) Inventor: Leonito E. Marchan, 13630 E. Foster Ave., Apartment 13, Baldwin Park, CA (US) 91706

( * ) Notice: Subject to any disclaimer, the term of this patent is extended or adjusted under 35 U.S.C. 154(b) by 0 days.

(21) Appl. No.: 11/152,733

(22) Filed: Jun. 15, 2005

(51) Int. Cl.
*G08B 21/00* (2006.01)

(52) U.S. Cl. ............... 340/667; 340/573.1; 340/457.1; 340/666; 340/438; 340/540; 340/541

(58) Field of Classification Search ................ 340/667, 340/573.1, 457.1, 666, 438, 541, 540
See application file for complete search history.

(56) References Cited

U.S. PATENT DOCUMENTS

| | | | |
|---|---|---|---|
| 5,949,340 A | 9/1999 | Rossi | |
| 5,966,070 A | 10/1999 | Thornton | |
| D424,463 S | 5/2000 | Babers, Jr. | |
| 6,104,293 A * | 8/2000 | Rossi | 340/573.1 |
| 6,104,393 A | 8/2000 | Santos-Gomez | |
| 6,535,137 B1 | 3/2003 | Ryan | |
| 6,819,249 B1 * | 11/2004 | Papp | 340/573.1 |
| 6,922,147 B1 * | 7/2005 | Viksnins et al. | 340/573.1 |
| 2003/0122662 A1 | 7/2003 | Quinonez | |
| 2005/0057350 A1 * | 3/2005 | Younse | 340/457.1 |

* cited by examiner

*Primary Examiner*—Tai T. Nguyen

(57) ABSTRACT

An alarm includes a pressure-actuated sensor positional beneath the seat liner of a vehicle child seat. The sensor includes a plastic enclosure positioned thereabout for shielding the sensor from foreign elements. A speaker is coupled to the sensor and is attachable to an outer surface of the child seat. A push button switch is coupled to the sensor and the speaker, and is attachable to a vehicle door. The switch includes a female receptacle and a male plug mateable therewith. The receptacle and plug communicate with the sensor. The sensor generates and transmits a signal when a threshold weight is detected and the vehicle door is ajar. The speaker receives the signal and emits an audible signal and continues to emit the signal until at least one sensor and push bottom switch are reset. A power source is coupled to the speaker.

12 Claims, 4 Drawing Sheets

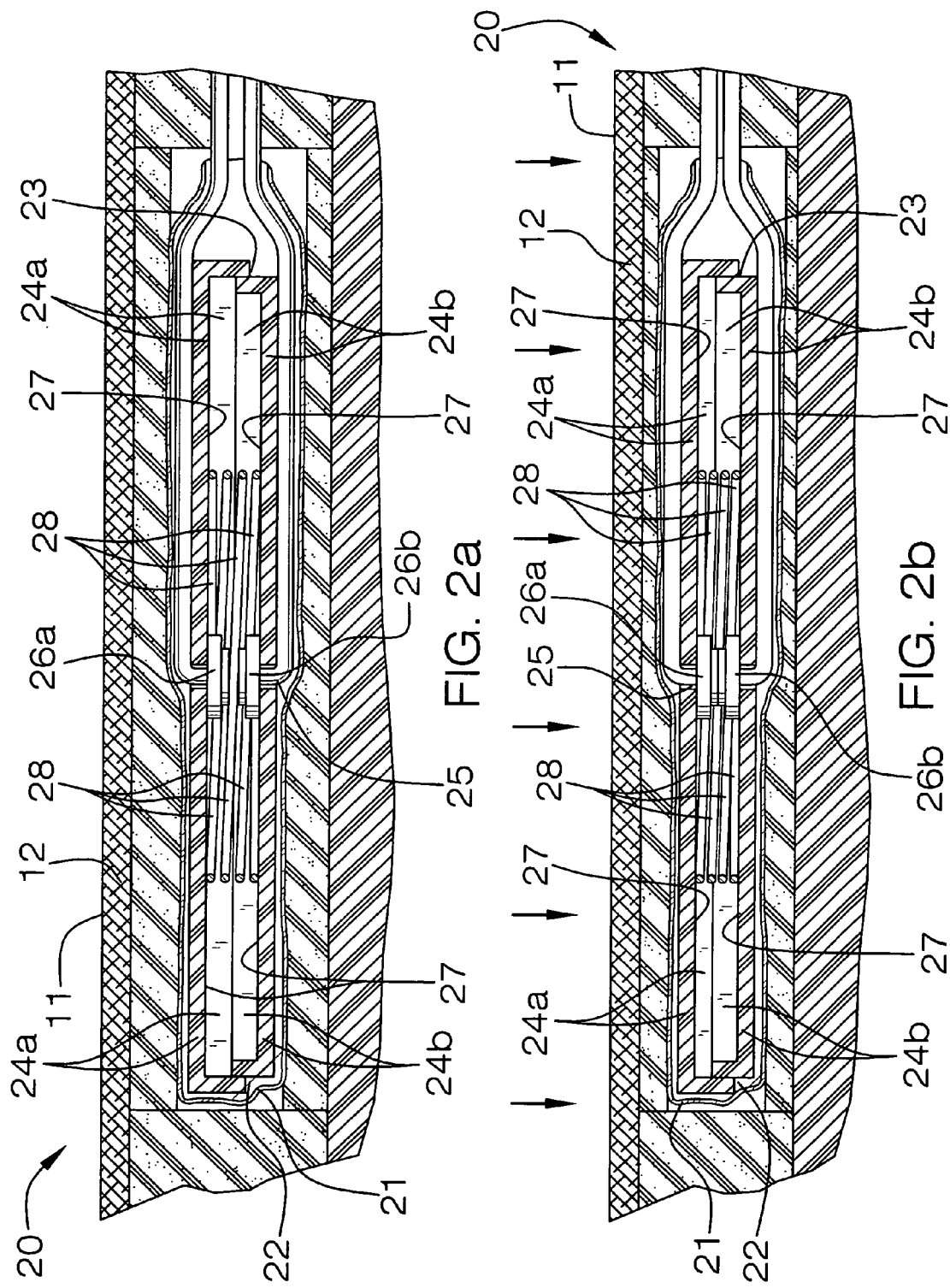

VEHICLE CHILD SEAT ALARM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to alarms and, more particularly, to a vehicle child seat alarm for alerting a driver when a child is left unattended in a vehicle child seat.

2. Prior Art

It seems that every summer there are news reports of children dying due to being left unattended in a closed vehicle. If a baby or young child is (inadvertently or purposefully) left in a vehicle, the child can quickly be in danger of serious heat-related problems. Even if windows are cracked open, the vehicle is parked in the shade, and the outside temperature seems temperate to an adult, the inside temperature of a vehicle can quickly become unbearable to a child trapped therein. Tragically, this often happens when well-meaning, but stressed or busy parents, forget to remove a sleeping infant or toddler from a car.

The use of alerting devices is known in the prior art. More specifically, alerting devices heretofore devised and utilized for the purpose of sensing occupants of vehicles are known to consist basically of familiar, expected and obvious structural configurations, notwithstanding the myriad of designs encompassed by the crowded prior art which have been developed for the fulfillment of countless objectives and requirements.

One example discloses a child warning system for use with a vehicle's car seat that is capable of providing alerts for such situations as the seat is improperly mounted or the restraint is improperly buckled. Another example discloses a mechanism for monitoring the occupancy of space in a vehicle to determine use of seatbelts and air bags. Yet another prior art example shows a mechanism for sensing the occupancy of passengers and a child seat in a vehicle for use in controlling air bags.

While these devices fulfill their respective, particular objective and requirements, the aforementioned patents do not describe a child seat alarm for preventing a child from being left inside a motor vehicle once a door of the vehicle has been opened or its engine has been shut off.

Accordingly, a need remains for a vehicle child seat alarm in order to overcome the above-noted shortcomings. The present invention satisfies such a need by providing a vehicle child seat alarm that is easy to use, gives parents peace of mind, and increases the safety of babies and young children. Such a system reminds the vehicle operator if a child is present in a car seat when the vehicle door is opened and/or the engine is turned off. This advantageously ensures that the person does not unintentionally forget the child in the vehicle, which could lead to serious injury or death of the child.

BRIEF SUMMARY OF THE INVENTION

In view of the foregoing background, it is therefore an object of the present invention to provide a vehicle child seat alarm. These and other objects, features, and advantages of the invention are provided by a vehicle child seat alarm for advantageously alerting a driver when a child is left unattended in a vehicle child seat.

The alarm includes a pressure-actuated sensor removably positional beneath the seat liner of a vehicle child seat. The sensor preferably further includes a cover formed from flexible and water-resistant material positioned thereabout for effectively and advantageously shielding the sensor from undesirable foreign elements. Such a cover defines a cavity therein. A housing formed from non-conductive material and including top and bottom portions is positioned within the cover. Such top and bottom portions are selectively engageable between compressed and equilibrium positions. The upper portion of the housing may be suitably sized and shaped for effectively sliding over the lower portion of the housing when a child sits on the vehicle child seat.

A contact switch has upper and lower plates electrically coupled to the speaker and the push button switch respectively. Such a contact switch is centrally positioned within the housing wherein the upper and lower plates are directly conjoined to inner surfaces of the top and bottom portions.

A deformably resilient spring member is positioned about the contact switch. Such a spring member and the top and bottom portions are slidably engaged to the compressed position when an infant is seated on the vehicle child seat. The spring member is sandwiched within the housing. The upper plate contacts the lower plate when the spring member and the top and bottom portions are at the compressed position. Such a spring member is compressible along a linear direction parallel to a vertical axis.

A speaker is electrically coupled to the sensor and is removably attachable to an outer surface of the vehicle child seat. Such a speaker preferably emits an audible alarm when the child seat is occupied and the vehicle door is opened to advantageously remind a driver of the presence of the child. A power source is electrically coupled to the speaker.

A push button switch is electrically coupled to the sensor and the speaker. The push button switch preferably includes a body that has a flange portion monolithically formed therewith. Such a flange portion is directly attachable to a vehicle door. A resilient finger member protrudes orthogonally and outwardly from the flange portion. Such a finger member is adaptable between extended and retracted positions, wherein the finger member is adapted to a retracted position when the vehicle door is closed and is adapted to an extended position when the vehicle door is open.

The push button switch is removably attachable to a vehicle door. Such a push button switch includes a female receptacle and a male plug mateable therewith. The receptacle and plug communicate with the sensor. Such a sensor generates and transmits a control signal when a weight equal to at least a predetermined weight threshold level is detected and the vehicle door is ajar. The speaker receives the control signal and emits an audible signal responsive to the control signal. Such a speaker continues emitting the audible signal until at least one sensor and push bottom switch are reset. The present invention further includes a wire grommet attached to an exterior surface of the child seat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2a is a cross-sectional view of the system shown in FIG. 1, taken along line 2a—2a and showing the system at a deactivated state;

FIG. 2b is a cross-sectional view of the system shown in FIG. 1, taken along line 2a—2a and showing the system at an activated state;

DETAILED DESCRIPTION OF THE INVENTION

Figure 1:
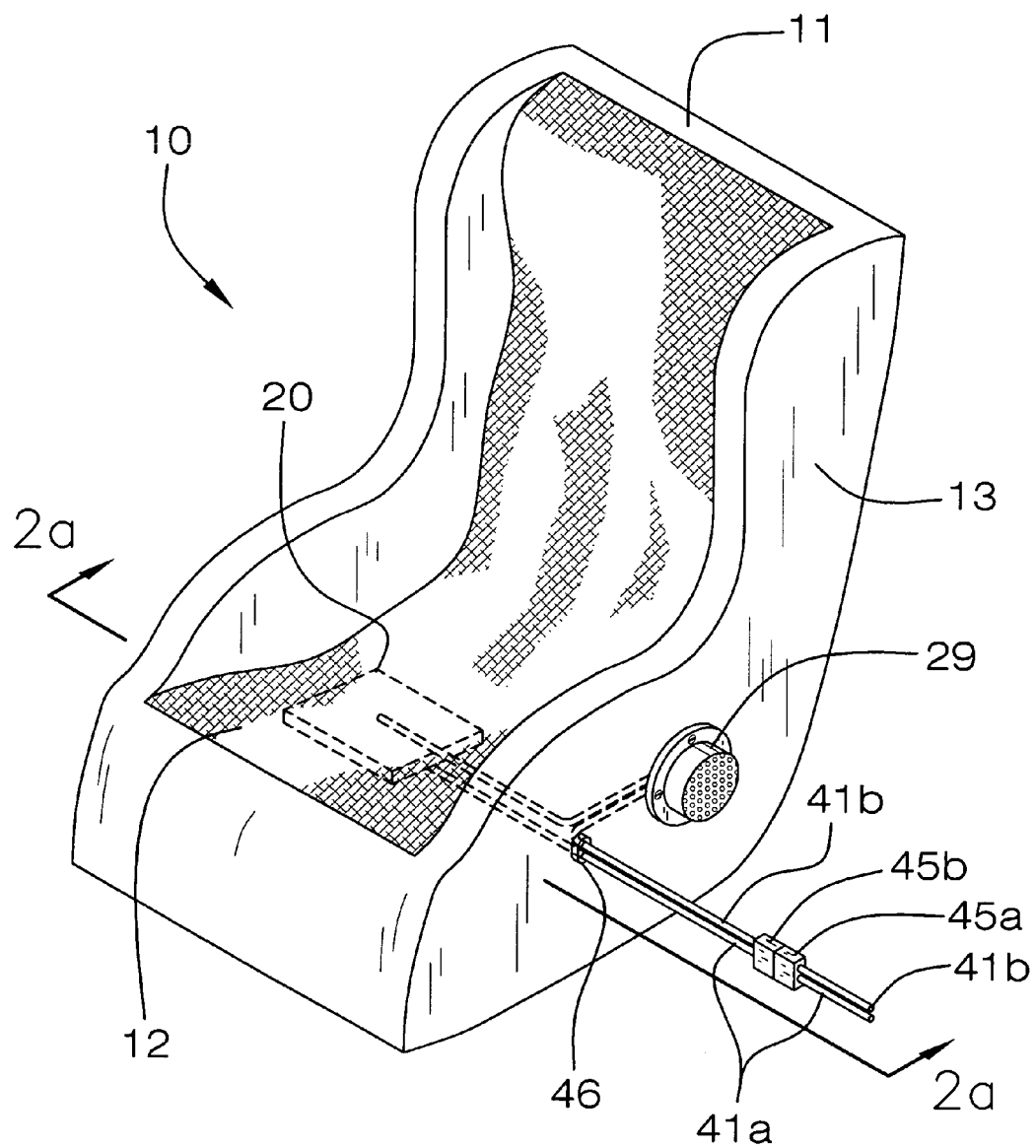
FIG. 1 is a perspective view showing a vehicle child seat alarm, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1–4b by the reference numeral 10 and is intended to provide a vehicle child seat alarm. It should be understood that the system 10 may be used to notify the presence of a child on many different types of surfaces and should not be limited in use to only vehicle child seats.

Referring initially to FIGS. 1, 2a and 2b, the system 10 includes a pressure-actuated sensor 20 removably positional beneath the seat liner 12 of a vehicle child seat 11. The sensor 20 further includes a cover 21 formed from flexible and water-resistant material positioned thereabout that is essential for effectively and advantageously shielding the sensor 20 from undesirable foreign elements. Such a cover 21 defines a cavity 22 therein. A housing 23 formed from non-conductive material and including top 24A and bottom 24B portions is positioned within the cover 21. Such top 24A and bottom 24B portions are selectively engageable between compressed and equilibrium positions.

The upper portion 24A of the housing 23 is suitably sized and shaped for effectively sliding over the lower portion 24B of the housing 23 when a child sits on the vehicle child seat 11. Of course, the system 10 can easily be introduced into newly constructed child seats 11, but may also be provided as a convenient addition to previously sold child seats 11, as is obvious to a person of ordinary skill in the art.

Referring to FIGS. 2a, 2b, 4a and 4b, a contact switch 25 has upper 26A and lower 26B plates electrically coupled to the speaker (described herein below) and the push button switch (described herein below) respectively. Such a contact switch 25 is centrally positioned within the housing 23 wherein the upper 26A and lower 26B plates are directly conjoined, with no intervening elements, to inner surfaces 27 of the top 24A and bottom 24B portions.

Referring to FIGS. 2a and 2b, a deformably resilient spring member 28 is positioned about the contact switch 25. Such a spring member 28 and the top 24A and bottom 24B portions are slidably engaged to the compressed position when an infant is seated on the vehicle child seat 11. The spring member 28 is sandwiched within the housing 23. The upper plate 26A contacts the lower plate 26B when the spring member 28 and the top 24A and bottom 24B portions are at the compressed position. Such a spring member 28 is compressible along a linear direction parallel to a vertical axis.

Figure 4A:
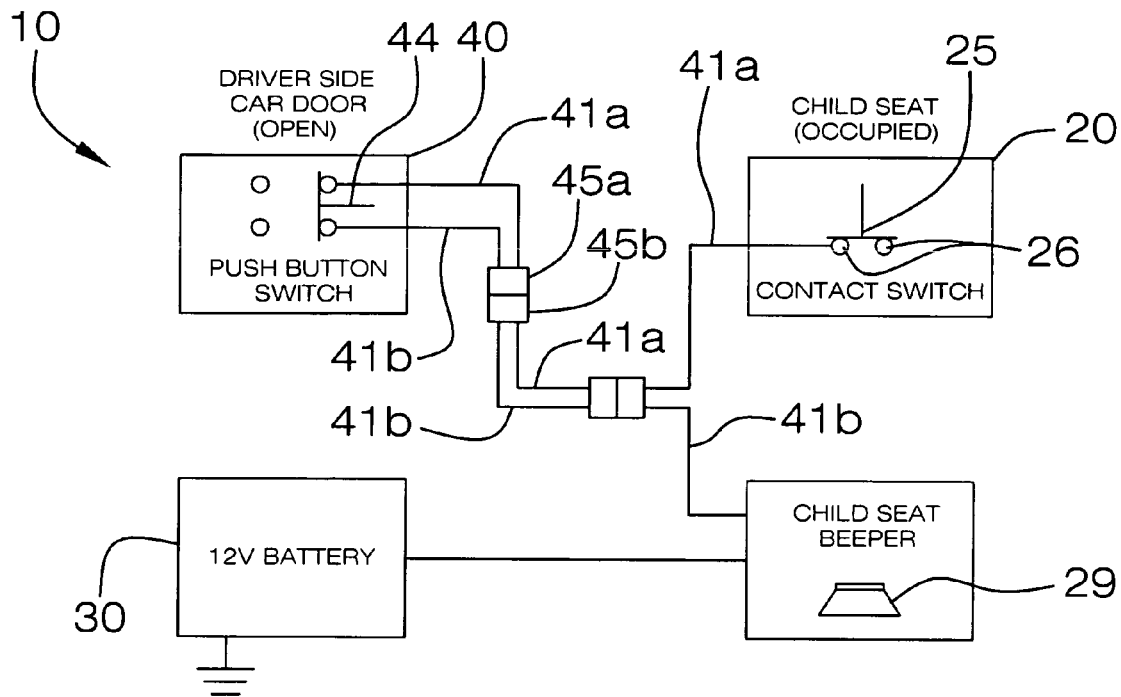
FIG. 4a is a schematic block diagram of the system shown in FIG. 1, showing the system at an activated state.
Figure 4B:
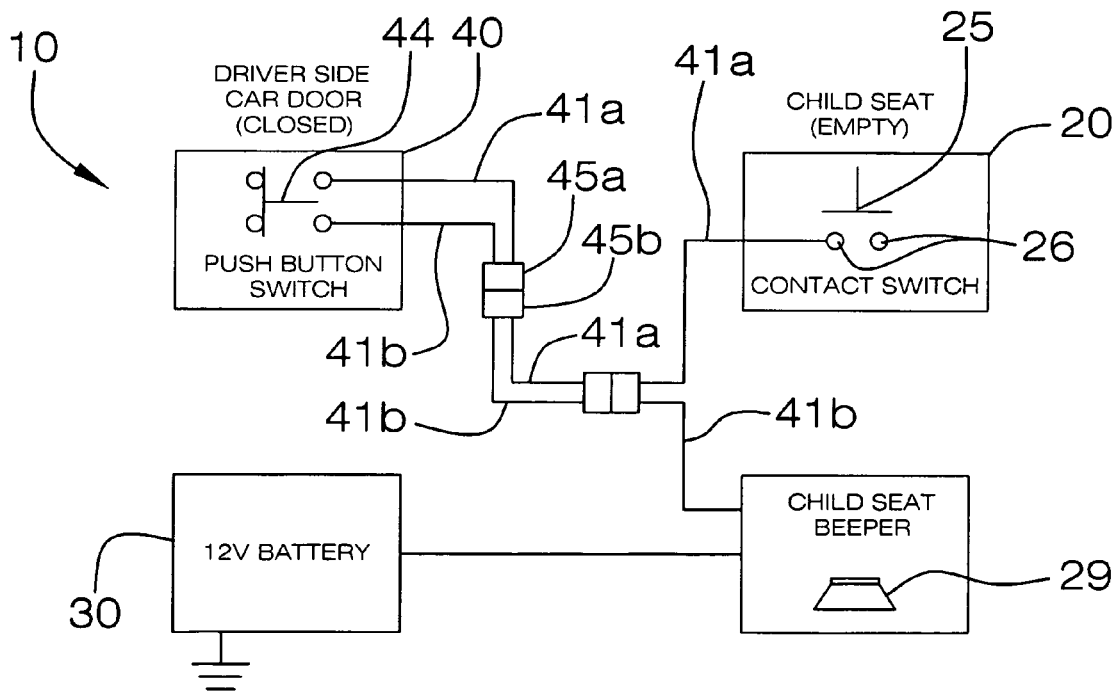
FIG. 4b is a schematic block diagram of the system shown in FIG. 4a, showing the system at a deactivated state.

Referring to FIGS. 1, 4a and 4b, a speaker 29 is electrically coupled to the sensor 20 and is removably attachable to an outer surface 13 of the vehicle child seat 11. Such a speaker 29 is vital and advantageous for emitting an audible alarm when the child seat 11 is occupied and the vehicle door 14 is opened to remind a driver of the presence of the child. A power source 30 is electrically coupled to the speaker 29, as is best illustrated in FIGS. 4a and 4b.

Referring to FIGS. 3a through 4b, a push button switch 40 is electrically coupled to the sensor 20 and the speaker 29 via a number of electrically conductive wires 41A, 41B, respectively. The push button switch 40 includes a body 42 that has a flange portion 43 monolithically formed therewith. Such a flange portion 43 is directly attachable, with no intervening elements, to a vehicle door 14.

A resilient finger member 44 protrudes orthogonally and outwardly from the flange portion 43. Such a finger member 44 is adaptable between extended and retracted positions, wherein the finger member 44 is adapted to a retracted position when the vehicle door 14 is closed and is adapted to an extended position when the vehicle door 14 is open. Of course, the finger member 44 may be alternately replaced by magnetic contact strips or another such activation means for notifying the system 10 of an opened vehicle door 14, as is obvious to a person of ordinary skill in the art.

Figure 3A:
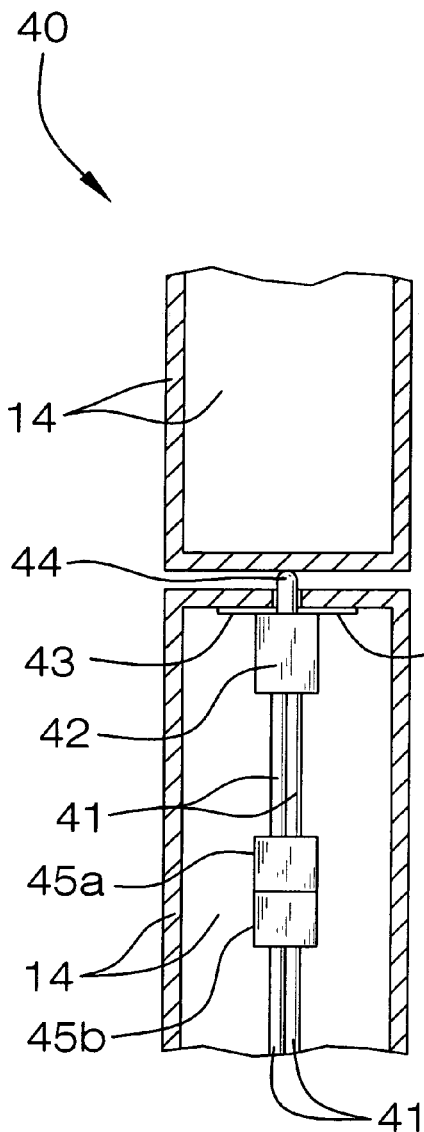
FIG. 3a is a cross-sectional view of the push button switch, showing the finger member at a retracted (deactivated) position.
Figure 3B:
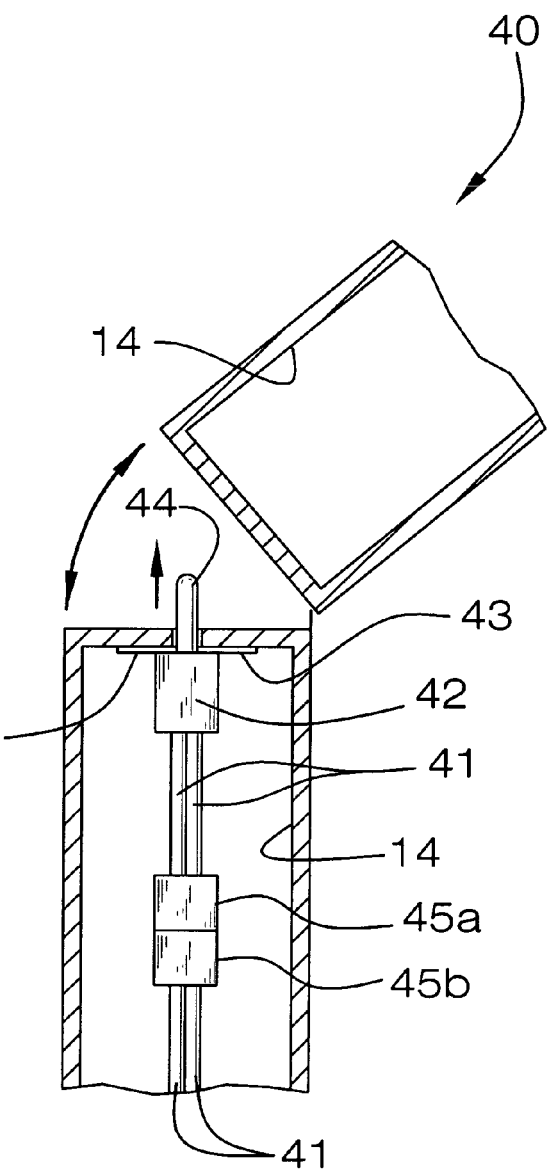
FIG. 3b is a cross-sectional view of the push button switch shown in FIG. 3a, showing the finger member at an extended (activated) position.

Referring to FIGS. 1, 3a, 3b, 4a and 4b, the push button switch 40 is removably attachable to a vehicle door 14. Such a push button switch 40 includes a female receptacle 45A and a male plug 45B mateable therewith. The receptacle 45A and plug 45B communicate with the sensor 20. Such a sensor 20 generates and transmits a control signal when a weight equal to at least a predetermined weight threshold level is detected and the vehicle door 14 is ajar, as is shown in FIGS. 3b and 4a. The speaker 29 receives the control signal and emits an audible signal responsive to the control signal, which is critical and advantageous for notifying the vehicle operator that a child or infant is still positioned within the child seat 11. Such a speaker 29 continues emitting the audible signal until at least one sensor 20 and push bottom switch 40 are reset. Thus, even if a parent walks away from the vehicle, other individuals in the nearby vicinity will hear the audible signal emitted by the speaker 29. Those individuals may then alert the parent of the unattended child, or attempt to remove the child themselves.

Referring to FIG. 1, the present invention further includes a wire grommet 46 attached to an outer surface 13 of the child seat 11 and spaced from the speaker 29. Of course, the wire grommet 46 may be alternately located depending on the needs of the system, as is obvious to person of ordinary skill in the art. Such a wire grommet 46 is advantageous and essential for effectively maintaining the electrically conductive wires 41A, 41B at substantially stable positions during operating conditions. This feature advantageously ensures that the wires 41 remain connected to the pushbutton switch 40, and thus allows for continued operation of the system 10.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A vehicle child seat alarm for alerting a driver when a child is left unattended in a vehicle child seat, said alarm comprising:
   a pressure-actuated sensor removably positional beneath a seat liner of a vehicle child seat;
   a speaker electrically coupled to said sensor and being removably attachable to an outer surface of the vehicle child seat;
   a push button switch electrically coupled to said sensor and said speaker, said push button switch being removably attachable to a vehicle door; and
   a power source electrically coupled to said speaker;
   wherein said sensor generates and transmits a control signal when a weight equal to at least a predetermined weight threshold level is detected and the vehicle door is ajar, said speaker receiving said control signal and emitting an audible signal responsive to said control signal, said speaker emitting said audible signal until at least one said sensor and said push bottom switch are reset;
   wherein said sensor comprises
   a cover formed from flexible and water-resistant material, said cover defining a cavity therein;
   a housing formed from non-conductive material and including top and bottom portions positioned within said cover, said top and bottom portions being selectively engageable between compressed and equilibrium positions;
   a contact switch having upper and lower plates electrically coupled to said speaker and said push button switch respectively, said contact switch being centrally positioned within said housing wherein said upper and lower plates are directly conjoined to inner surfaces of said top and bottom portions; and
   a deformably resilient spring member positioned about said contact switch, said spring member and said top and bottom portions being slidably engaged to the compressed position when an infant is seated on the vehicle child seat, said spring member being sandwiched within said housing;
   wherein said upper plate contacts said lower plate when said spring member and said top and bottom portions are at the compressed position, said spring member being compressible along a linear direction parallel to a vertical axis.

2. The alarm of claim 1, wherein said push button switch comprises:
   a body having a flange portion monolithically formed therewith, said flange portion being directly attachable to a vehicle door; and
   a resilient finger member protruding orthogonally and outwardly from said flange portion, said finger member being adaptable between extended and retracted positions, said finger member being adapted to a retracted position when the vehicle door is closed and being adapted to an extended position when the vehicle door is open.

3. The alarm of claim 1, wherein said upper portion of said housing is suitably sized and shaped for sliding over said lower portion of said housing when a child sits on the vehicle child seat.

4. The alarm of claim 1, wherein said speaker emits an audible alarm when the child seat is occupied and the vehicle door is opened to remind a driver of the presence of the child.

5. A vehicle child seat alarm for alerting a driver when a child is left unattended in a vehicle child seat, said alarm comprising:
   a pressure-actuated sensor removably positional beneath a seat liner of a vehicle child seat;
   a speaker electrically coupled to said sensor and being removably attachable to an outer surface of the vehicle child seat;
   a push button switch electrically coupled to said sensor and said speaker, said push button switch being removably attachable to a vehicle door;
   a power source electrically coupled to said speaker;
   wherein said sensor generates and transmits a control signal when a weight equal to at least a predetermined weight threshold level is detected and the vehicle door is ajar, said speaker receiving said control signal and emitting an audible signal responsive to said control signal, said speaker emitting said audible signal until at least one said sensor and said push bottom switch are reset; and
   a wire grommet directly attached to an exterior surface of the child seat;
   wherein said sensor comprises
   a cover formed from flexible and water-resistant material, said cover defining a cavity therein;
   a housing formed from non-conductive material and including top and bottom portions positioned within said cover, said top and bottom portions being selectively engageable between compressed and equilibrium positions;
   a contact switch having upper and lower plates electrically coupled to said speaker and said push button switch respectively, said contact switch being centrally positioned within said housing wherein said upper and lower plates are directly conjoined to inner surfaces of said top and bottom portions; and a deformably resilient spring member positioned about said contact switch, said spring member and said top and bottom portions being slidably engaged to the compressed position when an infant is seated on the vehicle child seat, said spring member being sandwiched within said housing;

wherein said upper plate contacts said lower plate when said spring member and said top and bottom portions are at the compressed position, said spring member being compressible along a linear direction parallel to a vertical axis.

6. The alarm of claim 5, wherein said push button switch comprises:

a body having a flange portion monolithically formed therewith, said flange portion being directly attachable to a vehicle door; and a resilient finger member protruding orthogonally and outwardly from said flange portion, said finger member being adaptable between extended and retracted positions, said finger member being adapted to a retracted position when the vehicle door is closed and being adapted to an extended position when the vehicle door is open.

7. The alarm of claim 5, wherein said upper portion of said housing is suitably sized and shaped for sliding over said lower portion of said housing when a child sits on the vehicle child seat.

8. The alarm of claim 5, wherein said speaker emits an audible alarm when the child seat is occupied and the vehicle door is opened to remind a driver of the presence of the child.

9. A vehicle child seat alarm for alerting a driver when a child is left unattended in a vehicle child seat, said alarm comprising:

a pressure-actuated sensor removably positional beneath a seat liner of a vehicle child seat;

a speaker electrically coupled to said sensor and being removably attachable to an outer surface of the vehicle child seat;

a push button switch electrically coupled to said sensor and said speaker, said push button switch being removably attachable to a vehicle door;

wherein said push button switch includes a female receptacle and a male plug mateable therewith, said receptacle and said plug for communicating with said sensor;

a power source electrically coupled to said speaker;

wherein said sensor generates and transmits a control signal when a weight equal to at least a predetermined weight threshold level is detected and the vehicle door is ajar, said speaker receiving said control signal and emitting an audible signal responsive to said control signal, said speaker emitting said audible signal until at least one said sensor and said push bottom switch are reset; and a wire grommet directly attached to an exterior surface of the child seat;

wherein said sensor comprises a cover formed from flexible and water-resistant material, said cover defining a cavity therein;

a housing formed from non-conductive material and including top and bottom portions positioned within said cover, said top and bottom portions being selectively engageable between compressed and equilibrium positions;

a contact switch having upper and lower plates electrically coupled to said speaker and said push button switch respectively, said contact switch being centrally positioned within said housing wherein said upper and lower plates are directly conjoined to inner surfaces of said top and bottom portions; and a deformably resilient spring member positioned about said contact switch, said spring member and said top and bottom portions being slidably engaged to the compressed position when an infant is seated on the vehicle child seat said spring member being sandwiched within said housing;

wherein said upper plate contacts said lower plate when said spring member and said top and bottom portions are at the compressed position, said spring member being compressible along a linear direction parallel to a vertical axis.

10. The alarm of claim 9, wherein said push button switch comprises:

a body having a flange portion monolithically formed therewith, said flange portion being directly attachable to a vehicle door; and a resilient finger member protruding orthogonally and outwardly from said flange portion, said finger member being adaptable between extended and retracted positions, said finger member being adapted to a retracted position when the vehicle door is closed and being adapted to an extended position when the vehicle door is open.

11. The alarm of claim 9, wherein said upper portion of said housing is suitably sized and shaped for sliding over said lower portion of said housing when a child sits on the vehicle child seat.

12. The alarm of claim 9, wherein said speaker emits an audible alarm when the child seat is occupied and the vehicle door is opened to remind a driver of the presence of the child.

* * * * *